United States Patent
Anderson et al.

(10) Patent No.: US 7,302,323 B2
(45) Date of Patent: *Nov. 27, 2007

(54) TRANSPORTATION DATA RECORDING SYSTEM

(75) Inventors: Geoffrey T. Anderson, Cornwall On Hudson, NY (US); Adrian Parvulescu, River Vale, NJ (US)

(73) Assignee: Polar Industries, Inc., New Windsor, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/141,812

(22) Filed: Jun. 1, 2005

(65) Prior Publication Data

US 2006/0276942 A1    Dec. 7, 2006

(51) Int. Cl.
*G01M 17/00* (2006.01)
(52) U.S. Cl. .............................. 701/35; 701/3; 701/13; 701/36; 340/945; 244/158.1
(58) Field of Classification Search .................... 701/3, 701/10, 13, 35, 36; 340/945; 244/158.1
See application file for complete search history.

(56) References Cited

U.S. PATENT DOCUMENTS

| 4,831,438 | A | 5/1989 | Bellman, Jr. et al. |
|---|---|---|---|
| 5,742,336 | A | 4/1998 | Lee |
| 6,014,381 | A | 1/2000 | Troxel et al. |
| 6,545,601 | B1 | 4/2003 | Monroe |
| 6,791,956 | B1 | 9/2004 | Leu |
| 2003/0052798 | A1 | 3/2003 | Hanson |
| 2003/0094541 | A1 | 5/2003 | Zeineh |
| 2004/0136388 | A1 | 7/2004 | Schaff |
| 2004/0230352 | A1* | 11/2004 | Monroe ............... 701/3 |

OTHER PUBLICATIONS

"SuperVision for Pilots," Aerial View Systems, http://www.aerialviewsystems.com/products/supervision/images/470cover.jpg, printed Apr. 2, 2005.
"The Networdk Camera Experience—Anymone, Anytime, Anywhere," Sony, Network Color Camera SNC-RZ30N (NTSC), IS-1153, MK7826V1iW02JUL, Printed in USA (Aug. 2002).
"The Power of Choice," www.pelcom.com, printed Dec. 21, 2004.

(Continued)

*Primary Examiner*—Gertrude A. Jeanglaude
(74) *Attorney, Agent, or Firm*—Lerner, David, Littenberg, Krumholz & Mentlik, LLP (57) ABSTRACT

The present invention provides a network data recording system particularly adapted for use in transportation systems. Cameras, microphones and a variety of sensors and existing vehicle systems are networked to a central controller, which receives and processes audiovisual and other data from the cameras and sensors. Raw and processed information is stored in a removable memory which may be mirrored to a fixed local memory. The fixed local memory can also be used to store programs and other system data. The controller may be ruggedized to meet disaster recovery requirements. Control panels can be placed throughout the vehicle for use by the crew to monitor conditions and respond to them. Information can be sent to a ground station, and the ground station may also exhibit control over the network data recording system. The system is suitable for use in all manner of transportation systems, such as aircraft, trains, and ships.

21 Claims, 8 Drawing Sheets

OTHER PUBLICATIONS

"Bosch Security Sytems: CCTV, Inti . . . ," Starpage Bosch.com, printed Dec. 21, 2004
"Ground Maneuvering Camera System," Airborne Video Cameras, Securaplane Technologies, Inc.
"External FlightVu Camera," FlightVu, AD Aerospace, http://www.ad-aero.com/print.php?file=http://www.ad-aero.com/products_equipment_exte . . . , printed Jan. 11, 2005.
"Internal FlightVu Camera," FlightVu, AD Aerospace, http://www.ad-aero.com/print.php?file=http://www.ad-aero.com/products_equipment_inte . . . , printed Jan. 11, 2005.
"VIP Aircraft Security—FlightVu Defender," FlightVu AD Aerospace, http://www.ad-aero.com/print.php?file=http://www.ad-aero.com/products_defender.htm, printed Jan. 11, 2005.
"Video Server," FlightVu, AD Aerospace, http://www.ad-aero.com/print.php?file=http://www.ad-aero.com/products_equipment.htm, printed Jan. 11, 2005.
"FlightVu CabinVu," FlightVu, AD Aerospace, http://www.ad-aero.com/print.php?file+http://www.ad-aero.com/products_cabinvu.htm, printed Jan. 11, 2005.
"FlightVu CargoVu," FlightVu, AD Aerospace, http://www.ad-aero.com/print.php?file=http://www.ad-aero.com/products_cargovu.htm, printed Jan. 11, 2005.
"Airline Security—FlightVu Witness," FlightVu, AD Aerospace, http://www.ad-aero.com/print.php?file=http://www.ad-aero.com/products_witness.htm, printed Jan. 11, 2005.
"Mike Home Testifies as Expert Witness—Sep. 2004," News Release, FlightVu, AD Aerospace, printed Jan. 11, 2005.
"FlightVu Defender," AD Aerosapce, Operating manual Issue G—Revised Mar. 2002.
"Axis 213 PTZ Network Camera," Axis Communications, www.axis.com, (c) 2004.
"New AXIS 213 PTZ," Axis Communications, Dec. 21, 2004.
"Flexible, Scalable System," Sony Real Shot Manager, Sony.
"History of Flight Recorders," L-3 Communications, Aviation Recorders, http://www.l-3ar.com/html/history.html, printed Jan. 11, 2005.
TEAC Wins U.S. Navy Contract for F/A-18 Cockpit Video Recorder System Upgrade, TEAC Airborne Video Products, http://www.teac-aerospace.com/DataRecorders/newsreleases/NavyFA . . . , printed Jan. 11, 2005.
"Durbin Urgers World Travel Ministers to Modernize Commercial Airplan Safety Equipment," US Senator Dick Durbin—Illinois—Press Release, http://www.senate.gov/-durbin/PressReleases/991203.htm, printed Jan. 11, 2005.
"Cockpit Video Recorders," The Subcommittee on Aviation Hearing on Issues Arising out of the Egypt Air Crash, http://www.house.gov/transportation/aviation/hearing/04-11-00/04-11-00memo.html, printed jan. 11, 2005
"NetSAM," On-Net Surveillance Systems, Inc., www.ONSS.com, printed Dec. 21, 2004.
"F.A.A. Wants to Require Airlines to Have Cockpit Voice Recorders That Run Longer," The New York Times, http://www.nytimes.com/2005/12/25/politics/25recorder.html?pagewanted=print&position=, printed Feb. 25, 2005.
"Understading Meteor Burst Communications Technologies, Seeking to Realize the Potential of a Reemergent Communications Capability," B. Craig Cumberland, Joseph S. Valacich, and Lenoard M. Jessup, Communicatins of the ACH, Jan. 2004/vol. 47, No. 1.
"Meteor Burst Communications: An Additional Means of Long-Haul Communications," John P. Jernovics Sr., USMC, http://www.globalsecurity.org/space/library/report/1990/JJP.htm, printed Apr. 2, 2005.
"Spectrum for Asset-Tracking Mobile Data networks Using Meteor Burst Systems," Radiocommunications Agency, A Consultation Document, Nov. 2002.
"Meteor Burst Communication, Nevada Research Uses Falling Stars for Data Transmission," Nevada Department of Transportation, TR News 171, Mar.-Apr. 1994.
"Sony SNC-P1," RealShot Network Camera, Sony Electronics, Inc., Security Systems, printed Sep. 2004.
"Real Shot Manger V2.1," Sony Electronics, Inc., Security Systems, printed Sep. 2004.

* cited by examiner

TRANSPORTATION DATA RECORDING SYSTEM

CROSS-REFERENCE TO RELATED APPLICATION

This application is related to U.S. patent application Ser. No. 11/142,713, filed Jun. 1, 2005, and entitled "SYSTEMS AND METHODS FOR DATA PROCESSING AND CONTROL IN A TRANSPORTATION SYSTEM," the entire disclosure of which is hereby expressly incorporated by reference herein.

BACKGROUND OF THE INVENTION

The present invention relates generally to network information recording systems. More particularly, the present invention relates to network video recording systems and methods for use with public or private transportation systems, such airplanes, trains, subways, ships and the like.

In the past, flight recorders have been used in airplanes and other aircraft to record specific parameters related to flight conditions, such as heading, altitude, and airspeed. Flight recorders are commonly referred to as "black boxes." The information contained in the black boxes may be essential to determine the cause of a fault or a failure in an airplane. Thus, over time, the sophistication and ruggedness of black boxes has greatly increased.

For example, early black boxes used magnetic tape to record cockpit voice communications. However, the magnetic tapes used to record analog or digital information can require complex fire and crash protection measures. Solid state flight data recorders were introduced to minimize this problem. Also, solid state components often permit easier and faster data retrieval than magnetic tape systems.

Newer black box systems have attempted to record and store video images based upon data received from externally or internally placed cameras. However, it is difficult to handle data input from a number of different sources and to enable real time control or processing of the data in a mobile environment.

Another problem that arises with the use of video cameras on airplanes and the like is that it is difficult to provide secure, real time video information to ground controllers while traveling. Furthermore, black box systems are often highly customized configurations set up for a specific type of airplane. It is thus desirable to provide a more flexible approach that can be used with different types of aircraft, as well as with trains, ships and other transportation systems. Therefore, a need exists for improved data recording and processing systems to address these and other problems.

SUMMARY OF THE INVENTION

In accordance with one embodiment of the present invention, a network data recording system for use in a transportation vehicle or aircraft is provided. The system comprises an imaging system, a sensory device, a control panel and a controller. The imaging system is operable to create digital imaging data. The sensory device is remote from the imaging system and is operable to sense a condition associated with the transportation vehicle or aircraft. The control panel is operatively connected to the imaging system and the sensory device. The control panel is operable to display the digital imaging data and to provide an indication of the condition sensed by the sensory device. The controller includes a communication input operatively connected to receive input data transmitted from the imaging system, the sensory device, and the control panel, as well as a processor operable to process the input data to create processed data.

In an alternative, the digital imaging data comprises one or both of digital still images and digital video images. In another alternative, the imaging system is further operable to record digital audio data, and the processor is further operable to receive the recorded digital audio data, to process the recorded digital audio data in conjunction with the input data from the imaging system, and to generate combined audio-visual data that is stored locally in the removable digital memory. In yet another alternative, at least one of the imaging system and the sensory device are indirectly coupled to the communication means of the controller through the control panel.

In a further alternative, the imaging system includes a plurality of cameras. A first camera is disposed within the transportation vehicle or aircraft. In this case, a second camera is preferably disposed on the exterior of the transportation vehicle or aircraft. Optionally, at least one of the cameras is operable to receive commands or instructions from the controller or the control panel and to record the digital imaging data based upon the commands or instructions.

In another alternative, the sensory device comprises a plurality of sensory devices. At least some of the sensory devices are disposed within the transportation vehicle or aircraft. In yet another alternative, the sensory device comprises a plurality of sensory devices, and at least one of the sensory devices is disposed on the exterior of the transportation vehicle or aircraft. In a further alternative, the sensory device is directly connected to the imaging system and receives instructions from the controller through the imaging system.

In accordance with another embodiment of the present invention, a network data recording system for use in a transportation vehicle or aircraft is provided. The system comprises an imaging system, a sensory device, a control panel and a controller. The imaging system is operable to create digital imaging data. The sensory device is positioned remotely from the imaging system and is operable to sense a condition associated with the vehicle. The control panel is operatively connected to the imaging system and the sensory device. The control panel can display the digital imaging data and can provide an indication of the condition sensed by the sensory device. The controller includes a communication input that is operatively connected to receive input data transmitted from the imaging system, the sensory device, and the control panel. The controller also includes a processor that is operable to process the input data to create processed data. The controller stores the processed data in a removable digital memory. The sensory device is operable to cause the imaging system to initiate an action without receiving input from the controller when the sensory device senses a condition. In an example, the sensory device comprises a motion sensor. When the motion sensor is triggered, the sensory device causes the imaging system to record the digital imaging data.

In another example, the control panel includes a display operable to display the digital imaging data from the imaging system, the processed data from the processor, and a representation of the condition sensed by the sensory device, and. The control panel also includes an input for receiving instructions from a user. In this case, the input preferably comprises a plurality of inputs. A first set of the inputs receives the user instructions. A second set of the inputs is used to authenticate the user. Here, the second set of inputs is desirably different from the first set of the inputs. The second set of inputs may include at least one of a keypad, touch screen and a keyboard optionally, the second set of inputs includes a biometric input. In another alternative, at least one of the second set of inputs is operable to receive an authorization device.

In accordance with yet another embodiment of the present invention, a network data recording system for use in a transportation vehicle or aircraft is provided. The system comprises an imaging system operable to create digital imaging data and a sensory device remote from the imaging system that is operable to sense a condition associated with the vehicle. The system also includes a control panel operatively connected to the imaging system and the sensory device. The control panel is used to display the digital imaging data and to provide an indication of the condition sensed by the sensory device. The system also has a controller, which includes a communication input for receiving input data transmitted from the imaging system, the sensory device, and the control panel, as well as a processor operable to process the input data to create processed data. Different levels of control panel rights are granted to different users.

In one example, the different levels of rights confer different levels of operational control of the control panel to the different users. In another example, the control panel comprises a plurality of control panels disposed at selected locations in the transportation vehicle or aircraft. A first control panel acts as a master control panel and the other control panels are slave control panels. In this case, selected users may be granted access to selected ones of the control panels.

In accordance with a further embodiment of the present invention, a network data recording system for use in a transportation vehicle or aircraft is provided. The system comprising an imaging system, sensory devices, a control panel and a controller. The imaging system records digital imaging data. The sensory devices can sense different conditions and generate sensory output based on the particular condition. The control panel is operatively connected to the imaging system and the sensory devices. The control panel displays the digital imaging data, provides an indication of the condition, and receive user input. The controller includes one or more connections operatively connected to the imaging system, the sensory devices, and the control panel, as well as a processor. The processor receives the digital imaging data and the sensory output as input data, receives the user input, processes the input data, and stores the processed data in memory.

In an alternative, the controller is further operable to control the imaging system and the sensory devices based upon the user input. In another alternative, the controller is controls the imaging system and the sensory devices automatically without the user input. In yet another alternative, the controller further includes a working memory for the processor to operate on the input data. In this case, the controller preferably also includes dedicated local storage for storing an operating system and program data. Here, the controller may also include a removable storage device for storing at least one of the processed data and the input data. Preferably, the removable storage device comprises a removable digital memory. The processed data is stored in the removable digital memory. Alternatively, the working memory, the dedicated local storage, and the removable storage device each comprise a non-volatile solid state memory.

In one example, at least one of the connections of the controller provides communication with a base station remote from the transportation vehicle or aircraft. In this case, the controller is preferably operable to transmit the processed data and the input data to the base station. Alternatively, the controller is operable to receive instructions from the base station. In this situation, the base station instructions can be used to control operations of the imaging system and the sensory devices. Optionally, the base station instructions delineate access to the control panel.

In accordance with yet another embodiment of the present invention, a network data recording system for use in a transportation vehicle or aircraft is provided. The system comprises imaging means for capturing imaging data associated with the vehicle and for generating a digital imaging output; means for sensing vehicle actions or events and for generating a digital sensing output; at least one control panel having means for authenticating a user, means for receiving input from the user, and means for providing visual information to the user based on the captured imaging data; and controller means for receiving the digital imaging output, the digital sensing output and the user input, generating processed data based upon the digital imaging output and the digital sensing output, and controlling operation of the imaging means the and sensing means based upon the user input. The system may further comprise means for communicating audiovisual data regarding a condition of the transportation vehicle or aircraft with other systems in the transportation vehicle or aircraft.

In accordance with a further embodiment of the present invention, a method of processing data in a transportation vehicle or aircraft network data processing system is provided. The method comprises generating imaging data from at least one camera; generating sensory data from at least one sensory device; processing the imaging data and the sensory data; storing the processed data in a local removable digital storage device; issuing instructions to the at least one camera to perform an imaging operation; and transmitting the processed data to a base station remote from the transportation vehicle or aircraft.

In accordance with another embodiment of the present invention, a data processing and control system for use with a transportation vehicle or aircraft is provided. The system comprises a mobile data system in the transportation vehicle or aircraft and a ground station. The mobile data system includes an imaging system for recording digital imaging data, a plurality of sensory devices to sense a condition and to generate a sensory output based on the condition, a control panel operatively connected to the imaging system and the sensory devices to display the digital imaging data, to provide an indication of the condition, and to receive input from a user, and a controller. The controller has connections operatively connected to the imaging system, the sensory devices, and the control panel, as well as a processor. The processor receives the digital imaging data and the sensory output as input data, receives the user input, processes the input data, and stores the processed data in memory. The ground station is remote from the transportation vehicle or aircraft. The ground station is in operative communication with the controller to receive the processed data and the input data from the controller and to provide instructions to the controller for operating the imaging system, the sensory devices and the control panel. In an example, the instructions include a priority command for the ground station to take operational control of the transportation vehicle or aircraft.

In accordance with yet another embodiment of the present invention, a management method for use with a mobile data system in a transportation vehicle or aircraft is provided. The mobile data system includes an imaging system for recording digital imaging data, sensory devices for sensing a condition and to generate a sensory output based on the condition, a control panel operable to provide an indication of the condition, to display the digital imaging data and to receive input from a user, and a controller operatively connected to the imaging system, the sensory devices, and the control panel. The method comprises obtaining imaging data from the imaging system; obtaining the sensory output from at least one of the sensory devices; transferring the imaging data and the sensory output from the controller to a base station remote from the transportation vehicle or aircraft; and issuing instructions from the base station to the controller to direct operation of the imaging system and the sensory devices. Preferably, the instructions include access instructions granting selected users predetermined permissions for the control panel.

DETAILED DESCRIPTION

In describing the preferred embodiments of the present invention illustrated in the appended drawings, specific terminology will be used for the sake of clarity. However, the invention is not intended to be limited to the specific terms used, and it is to be understood that each specific term includes all technical equivalents that operate in a similar manner to accomplish a similar purpose.

Figure 1:
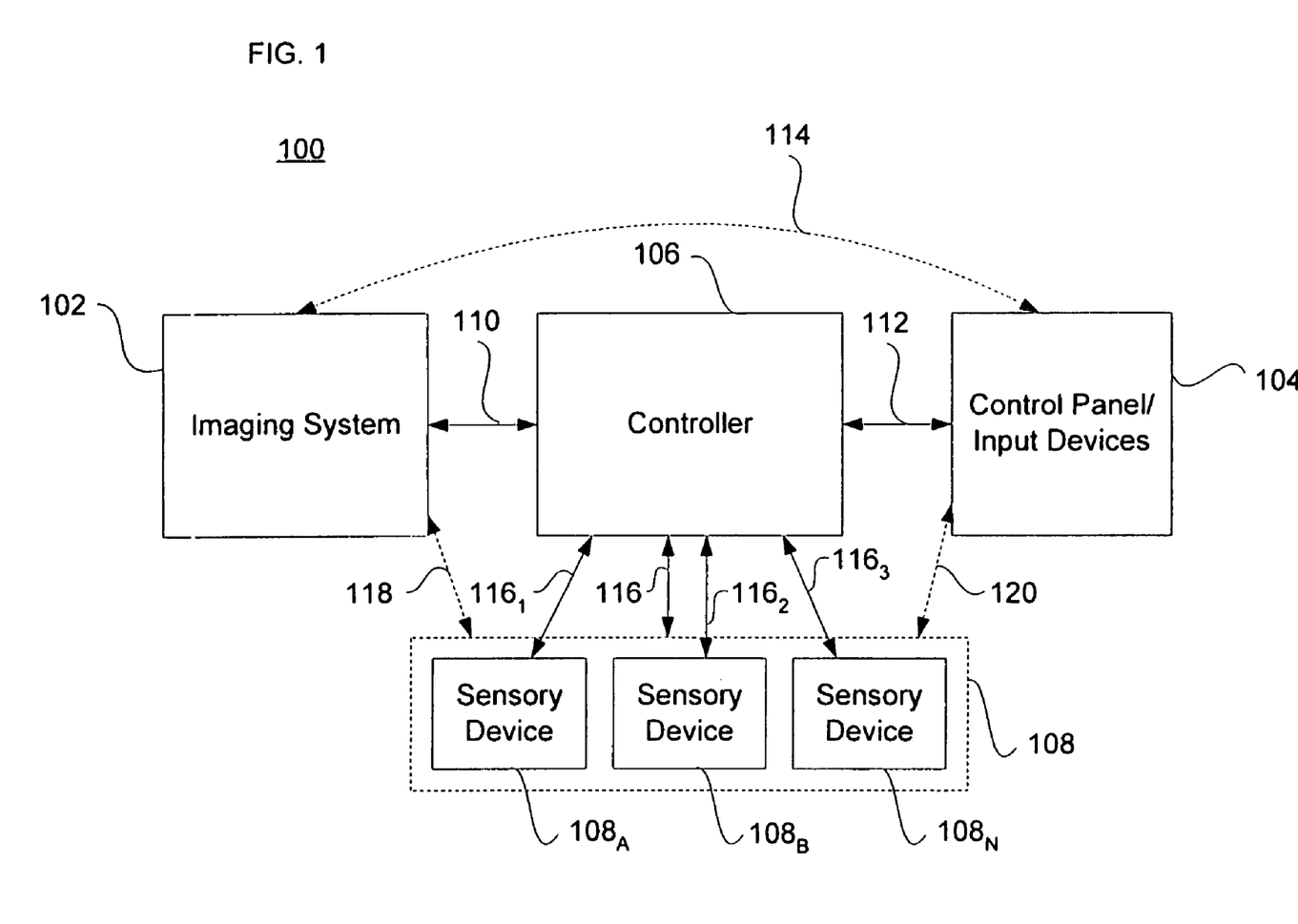
FIG. 1 illustrates a network data recording system in accordance with one embodiment of the present invention.

FIG. 1 illustrates a block diagram of a network data recording system 100 in accordance with a preferred embodiment of the present invention. As shown in this figure, the system 100 includes an imaging system 102, a control panel and/or input device(s) 104 ("control panel") and a controller 106. One or more sensory devices 108 may also be part of the system 100. Desirably, each of these components is capable of generating digital output signals. While only three sensory devices 108 are shown in this figure, any number of sensory devices $108_1 \ldots 108_N$ can be provided. The imaging system 102, the control panel 104, and the sensory devices 108 are all connected to the controller 106, either directly or indirectly.

For instance, the imaging system 102 may directly connect to the controller 106 via link 110. The control panel 104 may directly connect to the controller 106 via link 112. The imaging system 102 and the control panel 104 may also be directly linked via path 114. In this case, the imaging system 102 may indirectly send/receive data to/from the controller 106 through the control panel 104. Similarly, the control panel 104 may indirectly communicate with the controller 106 through the imaging system 102. One or more of the sensory devices $108_1 \ldots 108_N$ may directly communicate with the controller 106 via link 116. The link 116 may comprise one or more channels or paths $116_1 \ldots 116_N$, which may be combinable in a single communications stream, or which may be separate, uncombined communications streams. Alternatively, one or more of the sensory devices $108_1 \ldots 108_N$ may indirectly communicate with the controller 106 through path 118 to the imaging system 110, and/or through path 120 through the control panel 104. Any of the direct and/or indirect routes or paths may be a wired link or a wireless link. The network data recording system 100 is preferably in communication with a ground station or base station 200, as will be explained in more detail below with respect to FIG. 4.

Figure 2:
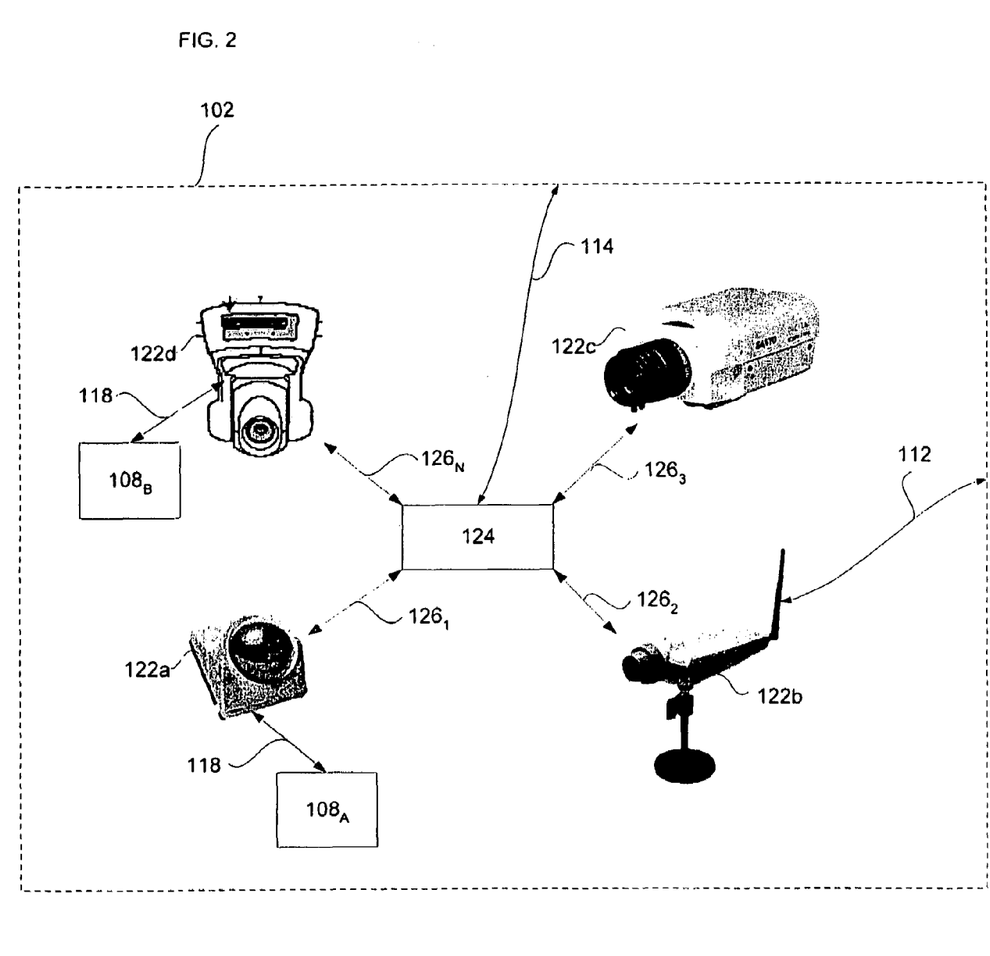
FIG. 2 illustrates an example of an imaging system in accordance with preferred embodiments of the present invention.

FIG. 2 illustrates a preferred embodiment of the imaging system 102 in more detail. The imaging system 102 may include one or more cameras 122, such as cameras 122a-d. The particular number of cameras will depend upon a variety of factors, such as the information to be recorded and the size of the craft or vehicle. In particular, the cameras 122 may be of different types, such as a still camera without audio 122a, a still camera with audio 122b, a video camera without audio 122c, and a video camera with audio 122d. Furthermore, as will be discussed below with respect to FIGS. 5 and 6, one or more of the cameras 122 may be external cameras placed outside the vehicle, and other ones of the cameras 122 may be internal cameras placed at various points within the vehicle. The cameras may have conventional CCD or CMOS imagers such as optical imagers, thermal imagers and the like. Some or all of the cameras 122 may link directly to the controller 106 or to the control panel 104. Alternatively some or all of the cameras 122 may indirectly connect to a hub or switch 124 via paths $126_1 \ldots 126_N$. In this case, the hub 124 would then communicate with the controller 106 and/or the control panel 104. The hub may be a conventional hub such as the D-Link DUB-H4 hub.

Preferably, each of the cameras 122 is a digital camera. More preferably, each camera 122 outputs images in at least one digital format, which may be a standard digital still image format such as JPEG or standard digital video formats such as MPEG-4, WMV, AVI, or QuickTime, although other formats may be used. The cameras 122b and 122d capable of audio capture preferably output the audio in at least one digital format, which may be a standard digital format such as WAV, MP3, WMA, ATRAC, etc., although other formats may be used. At least some of the cameras 122, in particular the internal cameras 122, may be capable of panning, tilting, and/or zooming, either mechanically or through image processing techniques.

The cameras 122 may be conventional off the shelf camera models, such as the SNC-P1 from Sony Electronics, the 213 PTZ from Axis, or the AVS-470 from Aerial View System. The particular components and configurations of the cameras 122 are not essential to the present invention. However, it is helpful to briefly identify the basic features for off the shelf cameras. According to its 2004 brochure, the Sony SNC-P1 provides a ¼ type progressive scan CCD that can operate using JPEG and MPEG compression schemes in multiple resolution modes. A microphone is built in. The SNC-P1 can interface to a system running Microsoft Windows 2000 or Windows XP. According to its 2004 brochure, the Axis 213 PTZ network camera provides a ¼ type interlaced CCD with JPEG and MPEG output. This camera also includes audio output, and supports Windows, Linux and Mac OS X. The brochures for both the Sony SNC-P1 and the Axis 213 PTZ cameras are hereby expressly incorporate by reference herein.

As discussed above, the cameras 122 may capture video images, still images, and, optionally, audio information. The captured imaging and/or audio information is preferably digitized and transmitted to the controller 106. The cameras 122 can receive commands or instructions either directly from the controller 106 or from the control panel 104. The commands/instructions may be automated commands that are triggered at a given time or based upon a predetermined event. Alternatively, the commands/instructions may be manually entered by a user, for example a user at the control panel 104 or by a user at the ground station 200.

The system 100 may perform various functions either autonomously or in response to the commands/instructions. For instance, a selected camera 122 may increase or decrease its transmitted frame rate of still or full motion images. The resolution may be increased or decreased, for example based on detected motion or suspicious activity. The camera 122 may pan, tilt, and/or zoom, either mechanically or through image processing. The camera 122 may also be directed to follow a preset tour or to capture images if motion is detected in a field of view.

The sensory devices 108 (see FIG. 1), if used, can supplement the audiovisual ("A/V") information provided by the cameras 122. By way of example only, the sensory devices 108 can perform typical sensor functions that can be conducted aboard commercial airliners or other vehicles, such as smoke detection, carbon monoxide detection, temperature sensing, pressure sensing or altitude determination. Other sensor functions may include, but are not limited, to motion sensing, sensing radioactivity levels, or ascertaining the presence or absence of biological or chemical substances. Metal detection is yet another example of what selected sensory devices 108 may perform.

As explained with respect to FIG. 1, one or more of the sensory devices 108 may provide data directly to the imaging system 102 instead of transmitting information directly to the controller 106. For instance, one of the sensory devices $108_A$ may provide audio information to one of the cameras 122 that is not audio capable. In this case, the camera 122 may be configured to transmit both the audio and visual information to the controller 106 for processing. Alternatively, one of the sensory devices $108_B$ may perform motion detection. In this case, upon sensing motion, the sensory device $108_B$ may send a signal to one or more of the cameras 122, which in turn may trigger the camera(s) 122 to send still or video images back to the controller 106 or to one or more of the control panels 104, or to perform other functions. The sensory devices 108 preferably output information in a digital format.

Each of the sensory devices 108 may perform a specific function, or may perform multiple functions. By way of example only, a selected sensory device 108 may be placed in a bathroom and perform smoke detection and motion sensing. If smoke is detected without also triggering the motion sensor, indicating the possibility of an electrical fire, the selected sensory device 108 may send an alarm to the control panel 104 and/or the controller 106, as well as cause a camera 122 in the bathroom to turn on. However, if smoke is detected along with motion in the bathroom, indicating the presence of a person smoking in contravention of flight regulations, the selected sensory device 108 may only send an alarm to a control panel 104 in the cabin to alert a flight attendant to take appropriate action.

Figure 3A:
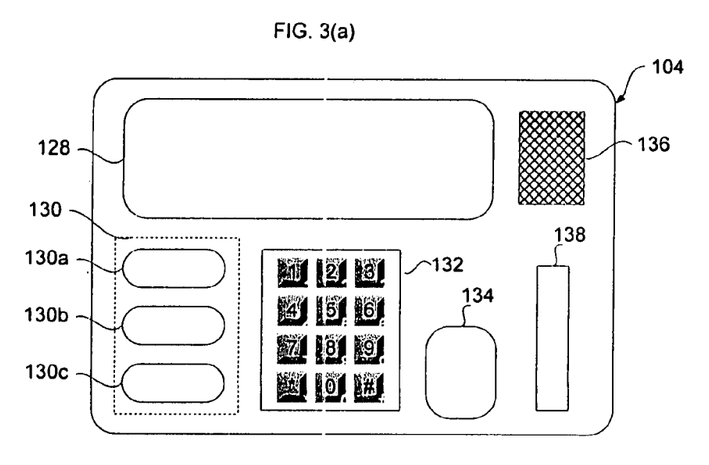
FIGS. 3(a)-(c) illustrate an example of a control panel that can be used in accordance with the present invention.

A preferred example of the control panel 104 is shown in more detail in FIG. 3(a). The control panel 104 desirably provides a secure, password protected user link to the components within the system 100, either via the controller 106 or directly with the imaging system 102 and/or the sensory devices 108. The control panel 104 (or multiple control panels) can be used by authorized personnel to provide, for example, live A/V information from one or more of the cameras 122, and/or to play back stored data from the controller 106. The control panel 104 preferably includes a display 128 and one or more inputs 130. A keypad 132 may also be provided. In addition, a biometric input 134 may also be included as part of the control panel 104. Each of these components will now be described.

The display 128 may be any type of display capable of displaying text and/or images, such as an LCD display, plasma display or CRT monitor. While not required, it is preferable for the display 128 to be able to output all of the image types transmitted by the cameras 122. Thus, in a preferred example, the display 128 is a high resolution display capable of displaying JPEG images and MPEG-4 video. One or more speakers 136 may be associated with the display 128 to output audio received from the cameras 122 or from the sensory devices 108.

Figure 3B:
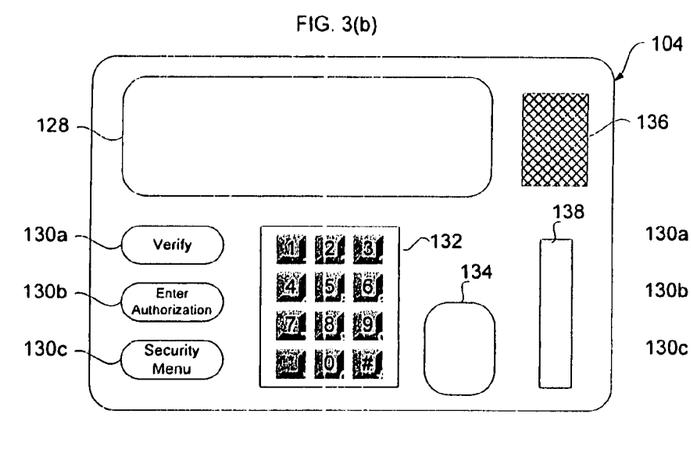
Figure 3C:
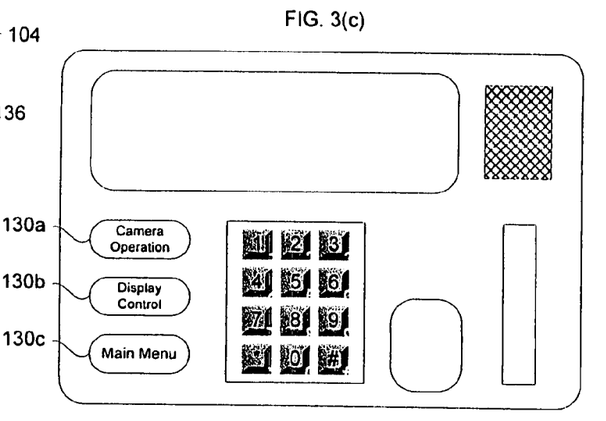

The inputs 130 can be, by way of example only, buttons, switches, knobs, dials, slide bars, etc. Alternatively, at least some of the inputs 130 may be implemented as "soft" inputs which may be programmable or automatically changed depending upon selections made by the user. For instance, the control panel 104 may require a user to input a password or other security identifier via the keypad 132 or via the biometric input 134. Prior to inputting the security identifier, a first soft input 130a may be labeled as "ENTER AUTHORIZATION" and a second soft input 130b may be labeled as "VERIFY", and a third soft input 130c may be labeled as "SECURITY MENU," as seen in FIG. 3(b). Once the user's security identifier is accepted, the first soft input 130a may be relabeled as "CAMERA OPERATION," the second input 130b may be relabeled as "DISPLAY CONTROL," and the third input 130c may be relabeled as "MAIN MENU," as seen in FIG. 3(c).

The keypad 132 may be a conventional keypad, including, for instance, numbers 0-9 and '*' and '#' keys. Alternatively, the keypad 132 may comprise a full or partial keyboard to permit the user to enter letters, numbers, and/or symbols. The keypad 132 may comprise mechanical keys or may be a "soft" keyboard similar to the soft inputs discussed above. In this case, the soft keypad 132 and the soft inputs 130 may be one integral set of inputs.

The biometric input 134 can provide a heightened level of security and access control. The biometric input 134 may be, by way of example only, a fingerprint or hand scanner, a retinal scanner, a voice analyzer, etc. Alternatively, multiple biometric inputs 146 can be used to assess multiple characteristics in combination, such as retinal and fingerprint scans, voice and fingerprint analysis, and so forth.

As a further option, the control panel 104 may include a separate input 138 to receive an authorization device such as a mechanical key, a magnetic swipe card, a radio frequency ID ("RFID") chip, etc. Thus, it can be seen that there are many ways to provide security and limit access to the control panel 104 and the overall system 100. This can be a very important feature, particularly in a commercial aircraft, where many people can potentially have access to the control panel 104. In such an environment, it may be essential to limit control panel access to the flight attendants, the pilot and copilot, and/or to air marshals.

While only one control panel 104 is illustrated in the system of FIG. 1, it is possible to place multiple control panels 104 throughout the craft, as will be discussed below the more detail with respect to FIG. 5(*a*). In this case, one of the control panels 104 may be designated as a "master" control panel 104' and other control panels 104 may be designated as "slave" control panels 104". The master control panel 104' may enable users to grant or deny permissions, or to restrict access to the slave control panels 104". Not all of the control panels 104 need include the display 128.

Different users may be granted access to only some of the control panels 104. For instance, in an airplane, the flight attendants may have access rights to all control panels 104 in the cabin; however, the pilot and copilot may have exclusive access rights to a control panel 104 located in the cockpit as well as access rights to all other control panels 104. In an alternative, the pilot or the copilot may have full permission rights when using any of the control panels 104 to view, modify, and/or process audio/video and other data. In this case, the flight attendants may have restricted permission rights to some or all of the control panels 104, such as to view audio and video data only, and/or to send alarms. He or she may also be able to send selected images, video clips or audio clips to the cockpit and/or to the ground station 200. An air marshal may have even more restricted access and/or permission rights, for instance limited to sending an alarm to the cockpit or to a ground station from a single terminal or control panel 106. Thus, it can be seen that access rights can include physical or logical access to the control panels 104, and permission rights can grant different levels of operational control to the user.

Figure 4:
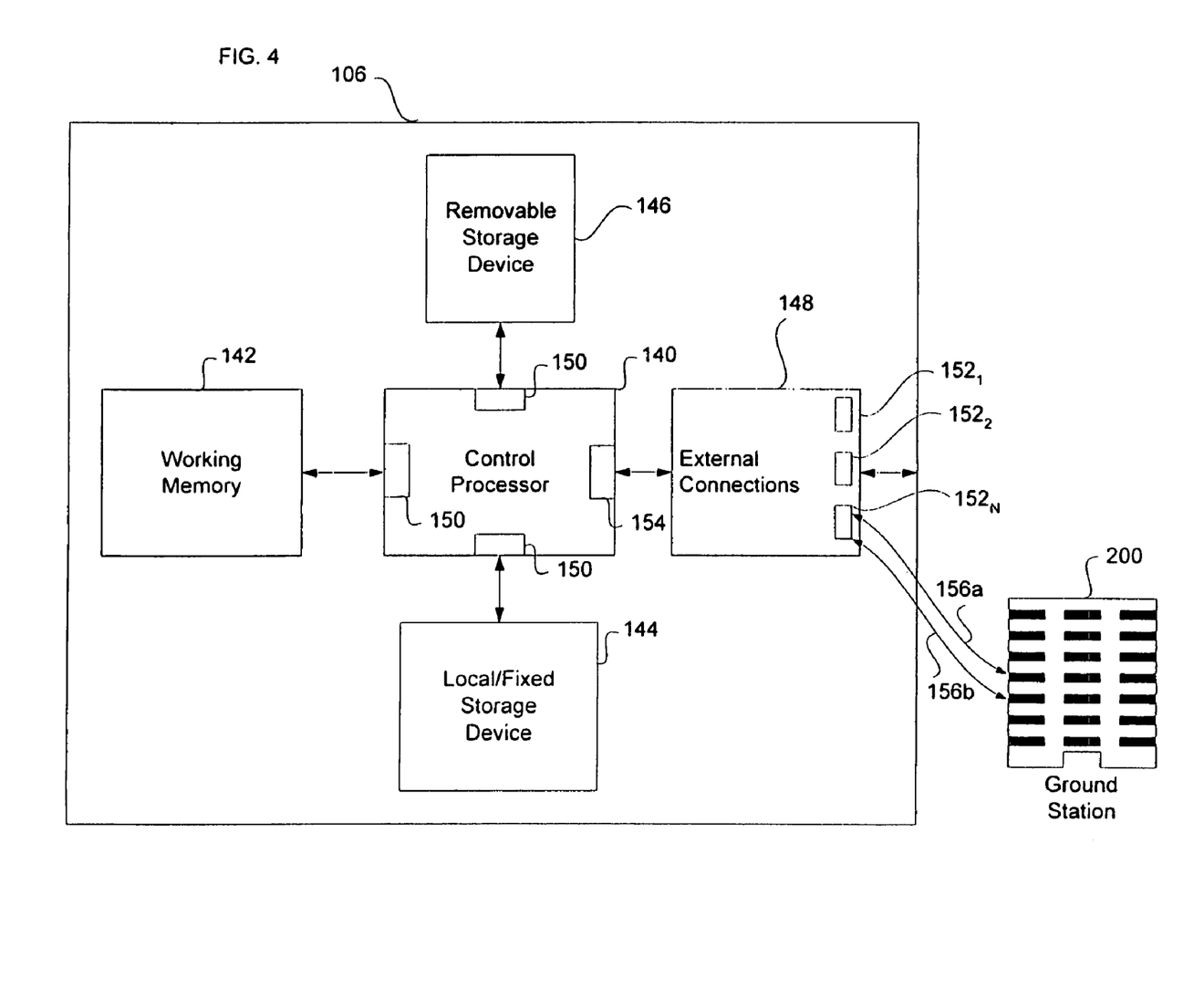
FIG. 4 illustrates a diagram of a controller in accordance with a preferred embodiment of the present invention.

A preferred embodiment of the controller 106 is illustrated in FIG. 4 in detail. As shown, the controller 106 includes a control processor or microprocessor 140, a working memory 142, a fixed storage device 144, a removable storage device 146, and one or more external connections 148. Each of these components will be discussed in turn.

The control processor 140, the working memory 142, the fixed storage device 144, the removable storage device 146, and the external connections 148 are preferably secured in a rugged chassis or case. For example, the chassis may be configured to provide fire and/or crash protection. The chassis may be permanently or removably secured in the vehicle. The chassis or case preferably complies with industry standards for ruggedness. Alternatively, off the shelf enclosures may be used, and may be modified to address vibration or survivability requirements.

The control processor 140 is the overall manager of the network data recording system 100. The control processor 140 manages communications with the other devices in the system such as the control panel 104, the cameras 122 of the imaging system 102, and the sensory devices 108. The control processor 140 also manages communication with the ground station 200, as will be discussed in more detail below.

When the control processor 140 receives imaging and/or audio data from the cameras 122, or when it receives other information from the sensory inputs 108, the control processor 140 performs data processing on the received information. In one example, the A/V information from one or more cameras may be combined into a single stream at the control processor 140 and processed together.

The controller 106, in particular the control processor 140, is capable of responding to and reacting to sensory input and A/V information received from the sensory devices 108 and the imaging system 102. By way of example only, the control processor 140 may perform compression or decompression of the video or audio information. The processing may also perform object detection, facial recognition, audio recognition, object counting, object shape recognition, object tracking, motion or lack of motion detection, and/or abandoned item detection. In another example, the control processor 140 may initiate communications with other components within the system 100 and/or with the base station 200 when suspicious activity is detected. The control processor 140 may also control the opening and closing of communications channels with the base station 200, perform system recovery after a power outage, etc.

While shown as a single component, the control processor 140 may comprise multiple integrated circuits that are part of one or more computer chips. The control processor 140 may include multiple processors and/or sub-processors operating separately or together, for example, in parallel. By was of example only, the control processor 140 may include one or more Intel Pentium 4 and/or Intel Xeon processors. ASICs and/or DSPs may also be part of the control processor 140, either as integral or separate components. One or more direct memory access controllers 150 may be used to communicate with the working memory 142, the local/fixed storage device 144, and/or the removable storage device 146.

The working memory 142 provides an electronic workspace for the control processor 140 to manipulate and manage video, audio and/or other information received from the imaging system 102 and the sensory devices 108. The working memory 142 preferably includes at least 128 megabytes of RAM memory, although more memory (e.g., one gigabyte) or less memory (e.g., 25 megabytes) can be used.

The fixed/local storage device 144 is primarily used to store the operating system of the control processor 140, operational programs, applets, subroutines etc., for use by the control processor 140. The operating system may be a conventional operating system such as Windows XP or Linux, or a special purpose operating system. Programs or applications such as digital signal processing packages, security software, etc. may be stored on the fixed/local storage device 144. Examples of signal processing software and security software include object detection, shape recognition, facial recognition and the like, sound recognition, object counting, and activity detection, such as motion detecting or tracking, or abandoned item detection. The fixed storage device 144 preferably comprises a non-volatile electronic or digital memory. More preferably, the digital memory of the fixed storage device 144 is a flash or other solid state memory.

The removable storage device 146 is preferably used to store database information, audio/video information, signaling data and other information. Signaling and other data may include GPS information, telemetry information, environmental input from other systems, etc. Raw or processed data received from the imaging system and/or the sensory devices is preferably stored in the removable storage device 146. In addition, imaging and sensory information processed by the control processor 140 may also be stored in the removable storage device 146. The removable storage device 146 preferably includes at least 100 gigabytes of storage space, although more or less storage may be provided depending upon system parameters, such as the amount of cameras 122 employed and whether full motion video is continuously recorded. The removable storage device 146 preferably comprises a hard drive or a non-volatile electronic or digital memory. Removable storage provide the ability to offload collected data for review and safekeeping. A mirror image of the data on the removable storage device may be maintained on the local fixed storage 144 until recording space is exceeded. In this case, the data may be overwritten in a first in, last out queuing procedure. More preferably, the digital memory of the removable storage device 146 is a hard drive, flash memory or other solid state memory. A backup of some or all of the imaging/sensory information may be stored in mirror fashion on the fixed/local storage device 144.

One or more of the external connections 148 communicate with the imaging system 102, the control panel 104, and the sensory devices 108. The external connections 148 may be one or more I/O ports $152_1 \ldots 152_N$ managed by an I/O controller 154 of the control processor 140. As indicated above, the links to the other system components within the vehicle may be wired or wireless. The connections may be serial or parallel. The connections may also operate using standard protocols such as IEEE 802.11, universal serial bus (USB), Ethernet, IEEE 1394 Firewire, etc., or non-standard communications protocols. Preferably, data is transmitted between system components using data packets such as IP packets.

In addition to local communication with the in-vehicle components discussed above, the control processor 140 is preferably also able to communicate with the ground station or base station 200, as shown in FIG. 4. Communication between the control processor 140 and the ground station 200 is preferably two-way, although this is not required. Ideally, the system 100 is configured so that the ground station 200 has access to the audio/video and sensory information collected and/or processed by the system 100. In addition, an alert may be sent to the ground station 200 if a security identifier is not accepted by the control panel 104 or if it otherwise appears that an unauthorized user is attempting to access the system 100.

The ground station 200 preferably includes a computer such as a PC, workstation or server that is configured to communicate with the system 100. The ground station computer may be a conventional computer or may be a special purpose computing device. The computer is preferably equipped with a high quality display device as well as speakers to reproduce the A/V and sensory information received from the system 100.

In addition to viewing and listening to information from the system 100, the ground station 200 may also have the ability to issue commands to and request actions from the system 100. By way of example only, one of the sensory devices 108 may trigger an alert regarding a device malfunction in the vehicle, such as a flap or rudder fault. If not automatically requested by the control processor 140 or manually requested by a user within the vehicle, an operator at the ground station may request an external camera 122 to turn on and take still or video images of the defective or malfunctioning device. The ground operator may also be granted the authority to limit access to the system 100, for example by denying some or all personnel in the airplane access to the control panels 104.

The ground station 200 may also be able to perform additional processing of the data received from the system 100. For example, the ground station 200 may include a dedicated computer or ASIC for performing digital signal processing on the received A/V and sensory information. The received information and/or post-processed data may be transmitted back to the system 100 or may be disseminated to other entities, such as the American Federal Aviation Administration ("FAA") or National Transportation Safety Board ("NTSB").

Data can be transmitted between one of the external connections 148 of the controller 106 and the ground station 200 in different ways. One or more communications channels 156 may be employed. The antenna structures may be placed in the aircraft's avionics bay, or may be wholly separate or redundant components from the aircraft's standard communications equipment. The ground station 200 may include multiple transceivers to communicate with different aircraft or different transportation vehicles. Of course, the specific type of transceiver will depend upon the particular communication scheme.

Slow and/or high speed communications channels may be used. For instance, a slow speed communications channel 156a may transmit still images, sensory data, etc. A high speed communications channel 156b may transmit full motion video with an audio track. By way of example only, the slow speed communications channel may transmit on the order of 150 kbits/sec or less, and the high speed communications channel may transmit on the order of 150 kbits/sec or more. Of course, it should be understood that these data transmission rates are merely exemplary, and transmission rates for the slow or high speed channels may vary depending upon a variety of factors such as the communications protocol, importance of the information to be sent, the vehicle's rate of speed, etc. The different communications channels may be combined in a single transmissions stream or as separate streams.

There are many different transmission schemes and architectures that can be used between the system 100 and the base station 200. By way of example only, TDMA, GSM and/or CDMA can be used. A CDMA-based system may be preferred because of the spread spectrum nature of the signaling. Satellite and direct microwave communications architectures may be employed, for example.

In almost all instances, the data transmitted between the system 100 and the base station 200 should be guarded to prevent unauthorized reception. Therefore, the data is preferably encrypted for transmission. Further security may be provided by utilizing a transmission scheme such as frequency hopping spread spectrum ("FHSS"). Here, the transmitted signal is multiplexed with a carrier that utilizes multiple discrete frequency bands. Because the transmission "hops" across these bands, only someone with knowledge of the predetermined arrangement of hops can intercept the signal.

An alternative transmission system may employ a technique known as meteor burst communications ("MBC"). An MBC system transmits data between two points by reflecting a signal off of ionized gasses left from the entry and disintegration of small meteors in the earth's atmosphere. Since the meteor trails occur in the atmosphere between 80 and 120 kilometers high, it is possible to achieve communication beyond the horizon. Because the trails are ephemeral in nature and may last only a few seconds at most, high data rate transmission bursts are employed. Interception is very difficult, due in part to the difficulty in intercepting the bursts, but also due to the fact that the interceptor must be very close to either the transmitter or the receiver. More details about MBC may be found in "Understanding Meteor Burst Communications Technologies" by Cumberland et al., published in the Communications of the ACM, Volume 47, No. 1, pp. 89-92, the entire disclosure of which is hereby expressly incorporated by reference herein.

Figure 5A:
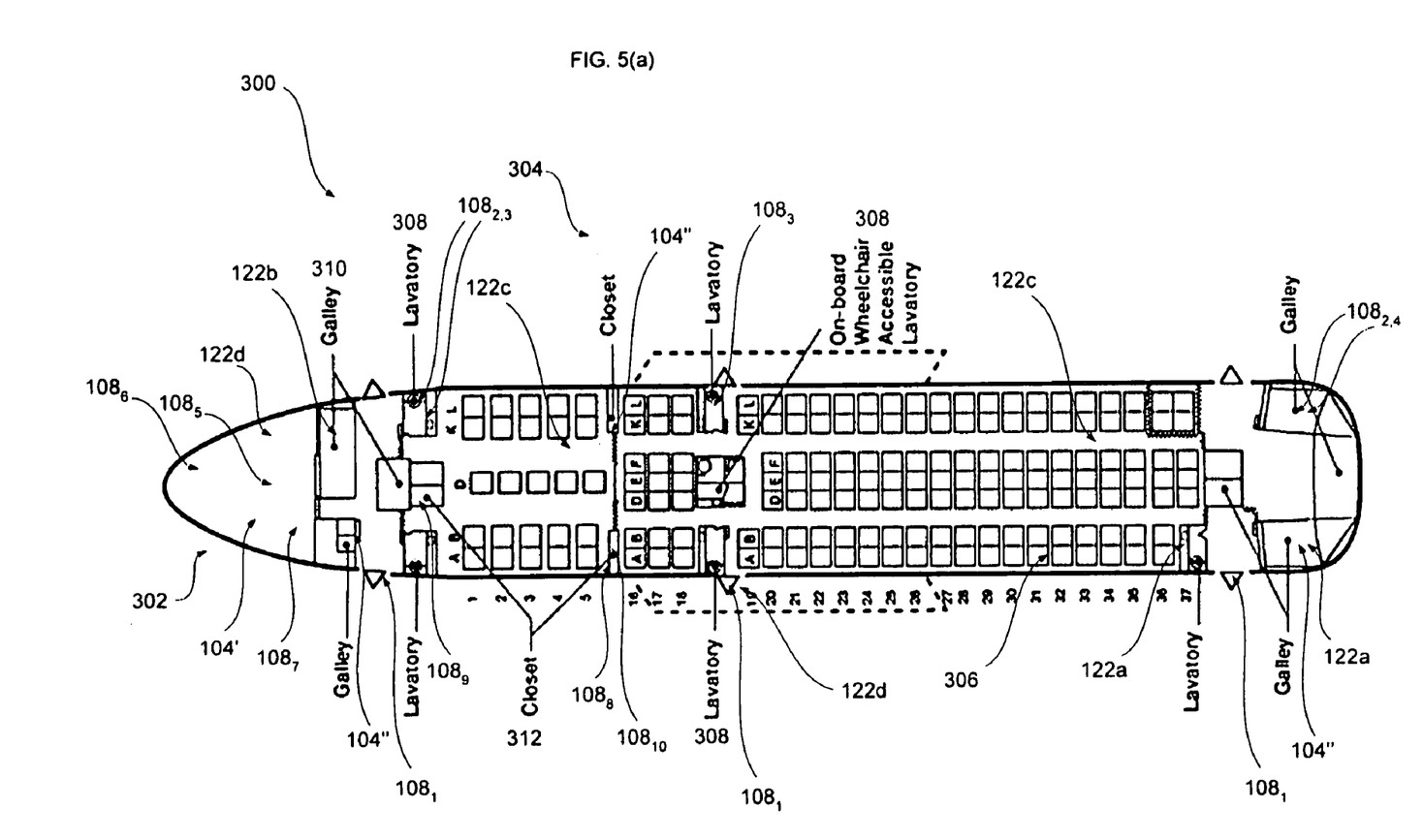
FIGS. 5(a)-(b) illustrate an aircraft-based network data recording system in accordance with a preferred embodiment of the present invention.
Figure 5B:
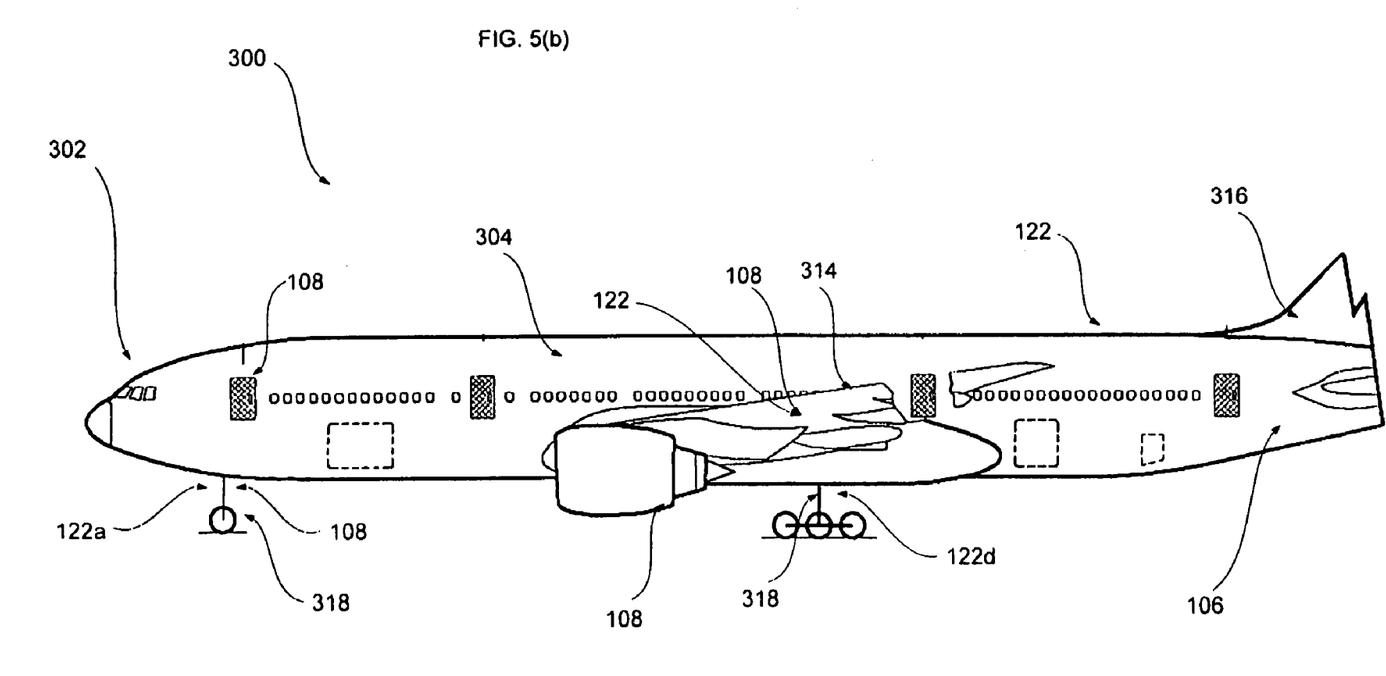

FIGS. 5(a)-(b) illustrate an example of the system 100 as the components may be positioned on an aircraft 300. As shown in FIG. 5(a), the interior of the aircraft 300 includes a cockpit 302 and a cabin 304. The cabin includes seating areas 306, and may include one or more lavatories 308, galleys 310, and/or closets 312. The wings 314 and tail section 316 of the aircraft 300 are partly shown in FIG. 5(b) but are omitted for the sake of clarity in FIG. 5(a). The controller 106 in its ruggedized case may be located near the rear of the cabin 304 or elsewhere close to the tail section 316. However, it should be understood that the controller 106 may be placed elsewhere within the aircraft 300. Multiple control panels 104 may be positioned at strategic locations throughout the cabin 304, as well as the cockpit 302. One of the control panels 104 may be a master control panel 104', for instance the control panel 104' located in the cockpit. Other control panels 104 may be slave control panels 104".

The cameras 122 may also be positioned at strategic locations throughout the cockpit 302 and the cabin 304. For example, a full motion video camera 122d with audio may be positioned in the rear of the cockpit 302 to provide a full view of the crew and instrumentation panels. Within the cabin 304, full motion video cameras 122c without audio may be positioned, for example, in the seating areas 306 with views of the aisles. Still cameras 122b with audio capability may be positioned, for example, in or near the galleys 310. Still cameras 122a without audio may be positioned, for example, adjacent to or within the lavatories 308. Of course, it should be understood that the different camera types may be placed in any desired location within the aircraft 300, and that the particular examples above are not the only way to configure the imaging system 102.

As seen in FIG. 5(b), external cameras 122 or the sensors 108 may be placed at or near the wings 314, the tail section 316, the wheel wells 318, or elsewhere. This enables the crew to perform a visual verification of exterior conditions and to double check sensor readings, for instance to confirm that the landing gear are down. In a cargo plane, the cameras 122 and/or the sensors 108 may be placed throughout the cargo bay. This can minimize the possibility that a loose container will cause damage during flight.

The sensory devices 108 may also be positioned throughout the cockpit 302 and the cabin 304. For example, sensory devices $108_1$ may be placed, for example, at an exterior door and may perform metal detection to identify people carrying knives, guns or other weapons. Sensory devices $108_2$ may be placed, for example, in the galleys 310 and the lavatories 308, and may perform smoke detection. Sensory devices $108_3$ may also be placed, for example, at or near the lavatories 308 and may perform motion sensing. Sensory devices $108_4$ may be placed, for example, in the cockpit 302, the galley 310, or the luggage areas (not shown) and may perform carbon monoxide detection. Other sensory devices $108_5$, $108_6$, and $108_7$ may be placed, for example, in the cockpit 302 or in the luggage or storage compartments below the cabin 304 to check the internal pressure, internal temperature, and altitude, respectively. Additional sensory devices $108_8$, $108_9$, and $108_{10}$ may be positioned, for example, in the closets 312 or in the below-deck luggage or storage compartments to detect nuclear, biological, or chemical hazards, respectively. Of course, it should be understood that the different sensory devices 108 may be placed in any desired location within or outside the aircraft 300, and that the particular examples above are not the only way to configure the sensory devices 108.

While the data recording system 100 may only receive and process data from the transportation vehicle or aircraft, it is possible to configure the system to take an active role in operating the transportation vehicle or aircraft. For instance, with respect to the aircraft 300, the control processor 140 may communicate with an automated flight control system, and may issue commands to the flight control system regarding modifying flight operations. Remote piloting of the aircraft or control over the transportation vehicle provides an added layer of security and safety. For example, when the aircraft or other vehicle is not within range of other two-way command and control systems, the operator may log in through the base station and take operational control of the aircraft or vehicle. Also, when the aircraft or transportation vehicle is within range of any other two-way command and control system, the operator may coordinate audiovisual feeds between the systems.

Figure 6:
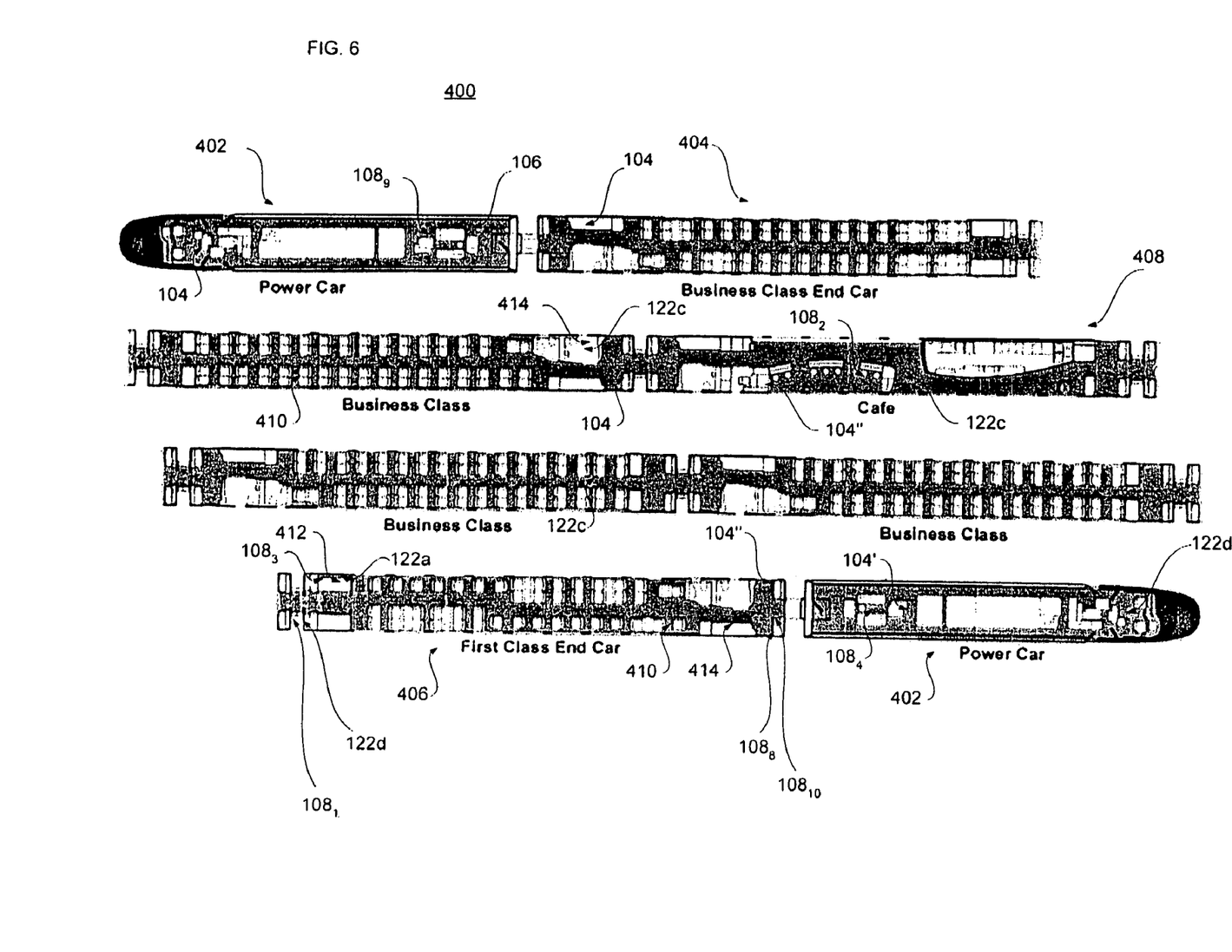
FIG. 6 illustrates a train-based network data recording system in accordance with a preferred embodiment of the present invention.

FIG. 6 illustrates an example of the system 100 as the components may be positioned on a train 400. As shown in the figure, the train 400 may include one or more power cars 402, business class cars 404, first class cars 406, and a café car 408. The business and first class cars 404, 406 include seating areas 410, and may include one or more lavatories 412 and/or closets 414.

The controller 106 in its ruggedized case may be located within one of the power cars 402; however, it should be understood that the controller 106 may be placed elsewhere within the train 400. Multiple control panels 104 may be positioned at strategic locations throughout the cars 404, 406 and 408, as well as the power cars 402. One of the control panels 104 may be a master control panel 104', for instance the control panel 104' located in the cockpit. Other control panels 104 may be slave control panels 104".

The cameras 122 may also be positioned at strategic locations throughout the power cars 402 and the other train cars 404, 406 and 408. For example, a full motion video camera 122d with audio may be positioned in the rear of the power cars 402 to provide a full view of the crew and instrumentation panels. Within the business and first class cars 404 and 406, full motion video cameras 122c without audio may be positioned, for example, in the seating areas 410 with views of the aisles. Still cameras 122b with audio capability may be positioned, for example, within the cafe car 408. Still cameras 122a without audio may be positioned, for example, adjacent to or within the lavatories 412. Of course, it should be understood that the different camera types may be placed in any desired location within the aircraft 300, and that the particular examples above are not the only way to configure the imaging system 102.

The sensory devices 108 may also be positioned throughout the power cars 402 and the other cars 404, 406 and 408. For example, sensory devices $108_1$ may be placed, for example, at exterior doors and may perform metal detection to identify people carrying knives, guns or other weapons. Sensory devices $108_2$ may be placed, for example, in the cafe car 408 and the lavatories 412, and may perform smoke detection. Sensory devices $108_3$ may also be placed, for example, at or near the lavatories 412 and may perform motion sensing. Sensory devices $108_4$ may be placed, for example, in the power car 402, the café car 408, or the luggage areas (not shown) and may perform carbon monoxide detection. The sensory devices $108_8$, $108_9$, and $108_{10}$ may be positioned, for example, in the luggage areas or in separate luggage cars (not shown) to detect nuclear, biological, or chemical hazards, respectively. Of course, it should be understood that the different sensory devices 108 may be placed in any desired location within the train 400, and that the particular examples above are not the only way to configure the sensory devices 108.

The data recording systems of the present invention enable onboard crews and ground crews access to unprecedented levels of up to the minute information about the vehicle during operation. As safety and security are paramount concerns, the condition of the vehicle can be monitored, and the activities of the passengers can also be observed. This can help to minimize the possibility than an unruly passenger or potential terrorist will create a dangerous condition during travel. Also, other emergency situations can be rapidly identified and dealt with, such as a passenger having a medical crisis.

While transportation examples showing airliners and trains have been illustrated and discussed, the invention is not limited to use with these specific examples. The data recording systems of the present invention can be utilized with all manner of transportation systems, including ships, subways, and helicopters, as well as airplanes and trains. In addition, the data recording systems can also be utilized in non-mobile environments as well.

Figure 7:
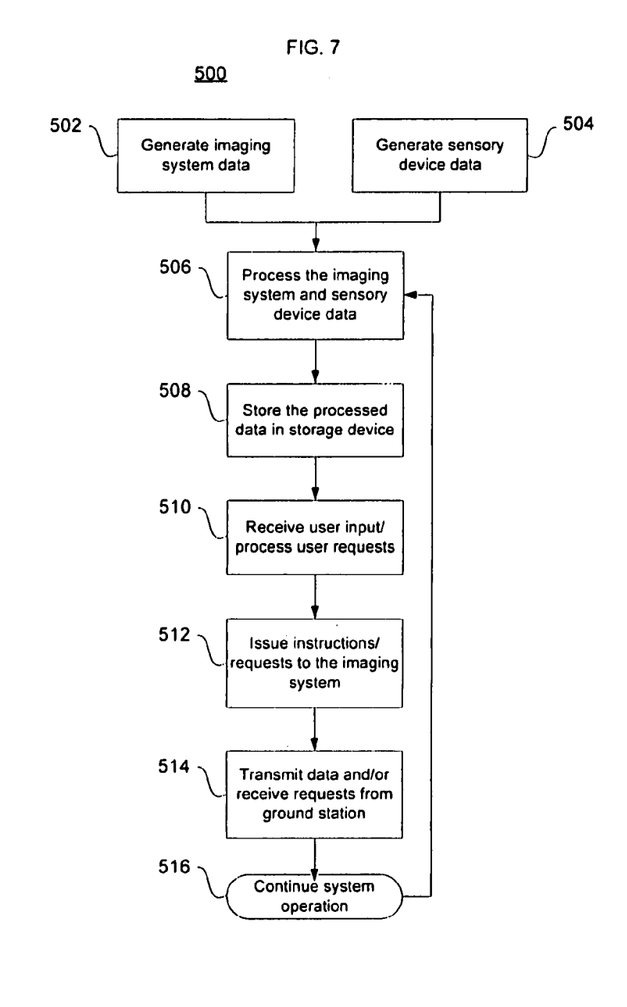
FIG. 7 is a flow diagram of system operation steps performed in accordance with a preferred embodiment of the present invention.

FIG. 7 illustrates a flow diagram 500, which shows an exemplary operational process of the system 100. As shown at steps 502 and 504, the imaging system 102 and the sensory device(s) 108 respectively generate data, either alone or in conjunction with one another. The data is provided to the controller 106 and is processed at step 506 by the control processor 140. By way of example only, A/V data from one of the cameras 122 and/or one of the sensory devices 108 is combined into a single A/V data stream and may be further processed using a facial recognition and/or a voice recognition application. Processed data is stored in a storage device such as the removable storage device 146 or the fixed storage device 144, as shown at step 508. A user at one of the control panels 104 or at the ground station 200 may generate a request to, for instance, view A/V data or to cause one of the cameras 122 to perform a particular action. The controller 106 or the control panel 104 may process the user request, as shown at step 510. Instructions or requests may be sent to the imaging system 102 or the sensory devices 108 by the controller 106 or the control panel 104, as shown at step 512. Of course, it should be understood that the controller 106 may issue requests autonomously without user input. Data may be transmitted to the ground station 200 as shown at step 514. Here, the controller 106 may also receive instructions or requests from the ground station 200. The system 100 may then continue with its operations as shown at step 516, for example with the controller 106 returning to processing data as in step 506.

Figure 8:
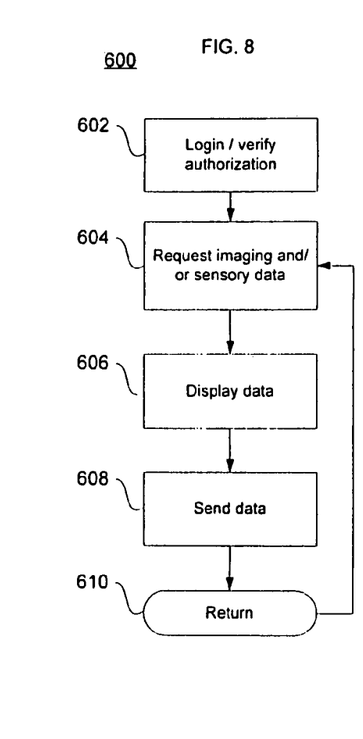
FIG. 8 is a flow diagram of steps performed by the control panel used in accordance with a preferred embodiment of the present invention.

FIG. 8 illustrates a flow diagram 600, which shows an exemplary operational process 600 of the control panel 104. Here, a user may log in and the control panel 104 may verify his or her access, as shown at step 602. The control panel 104 may perform the verification locally or may interact with the controller 106. In this case, the control panel 104 may transmit the user's passcode and/or biometric data to the controller 106, which may issue compare the information against information in a database stored in the fixed storage device 144 or the removable storage device 146. The controller 106 may then issue final approval of the user to the control panel 104. Once the user has been authenticated, he or she may request data from the system, as shown at step 604. For instance, the user may request current imaging data directly from the imaging system 102. The user may also request current sensory data directly from the sensory device (s) 108. The user may also request stored or processed imaging or sensory data from the controller 106. Assuming that the user has the appropriate level of permission rights, the requested information is displayed or otherwise presented at step 606. At step 608 the user may also send some or all of this data to another user or to another control panel 104, to the control processor 140 for additional processing, or to the ground station 200. Then at step 610 the process may return to step 604 so the user may request additional data to view. While the exemplary flow diagrams of FIGS. 7 and 8 illustrate steps in a certain order, it should be understood that different steps may be performed in different orders, and certain steps may be omitted.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. By way of example only, while different embodiments described above illustrate specific features, it is within the scope of the present invention to combine or interchange different features among the various embodiments to create other variants. Any of the features in any of the embodiments can be combined or interchanged with any other features in any of the other embodiments.

The invention claimed is:

1. A network data recording system for use in a transportation vehicle or aircraft, comprising:
   an imaging system operable to create digital imaging data;
   a sensory device remote from the imaging system and operable to sense a condition associated with the transportation vehicle or aircraft;
   a control panel operatively connected to the imaging system and the sensory device, the control panel being operable to display the digital imaging data and to provide an indication of the condition sensed by the sensory device; and
   a controller including:
      communication input operatively connected to receive input data transmitted from the imaging system, the sensory device, and the control panel, and
      a processor operable to process the input data to create processed data.

2. The network data recording system of claim 1, wherein the digital imaging data comprises one or both of digital still images and digital video images.

3. The network data recording system of claim 1, wherein the imaging system is further operable to record digital audio data, and the processor is further operable to receive the recorded digital audio data, to process the recorded digital audio data in conjunction with the input data from the imaging system, and to generate combined audiovisual data that is stored locally in the removable digital memory.

4. The network data recording system of claim 1, wherein at least one of the imaging system and the sensory device are indirectly coupled to the communication means of the controller through the control panel.

5. The network data recording system of claim 1, wherein the imaging system includes a plurality of cameras and a first one of the cameras is disposed within the transportation vehicle or aircraft.

6. The network data recording system of claim 5, wherein a second one of the cameras is disposed on the exterior of the transportation vehicle or aircraft.

7. The network data recording system of claim 5, wherein at least one of the cameras is operable to receive commands or instructions from the controller or the control panel and to record the digital imaging data based upon the commands or instructions.

8. network data recording system of claim 1, wherein the sensory device comprises a plurality of sensory devices, at least some of the sensory devices being disposed within the transportation vehicle or aircraft.

9. The network data recording system of claim 1, wherein the sensory device comprises a plurality of sensory devices, at least one of the sensory devices being disposed on the exterior of the transportation vehicle or aircraft.

10. The network data recording system of claim 1, wherein the sensory device is directly connected to the imaging system and receives instructions from the controller through the imaging system.

11. A network data recording system for use in a transportation vehicle or aircraft, comprising:
   an imaging system operable to create digital imaging data;
   a sensory device remote from the imaging system and operable to sense a condition associated with the vehicle;
   a control panel operatively connected to the imaging system and the sensory device, the control panel being operable to display the digital imaging data and to provide an indication of the condition sensed by the sensory device; and
   a controller including:
      communication input operatively connected to receive input data transmitted from the imaging system, the sensory device, and the control panel, and
      a processor operable to process the input data to create processed data and to store the processed data in a removable digital memory;
   wherein upon sensing the condition the sensory device is operable to cause the imaging system to initiate an action without receiving input from the controller.

12. The network data recording system of claim 11, wherein the sensory device comprises a motion sensor, and when the motion sensor is triggered the sensory device causes the imaging system to record the digital imaging data.

13. The network data recording system of claim 11, wherein the control panel includes:
   a display operable to display the digital imaging data from the imaging system, to display a representation of the sensed condition, and to display the processed data from the processor; and
   an input for receiving instructions from a user.

14. The network data recording system of claim 13, wherein the input comprises a plurality of inputs, a first set of the inputs for receiving the user instructions, and a second set of the inputs for authenticating the user.

15. The network data recording system of claim 14, wherein the second set of inputs is different from the first set of the inputs and the second set of inputs includes at least one of a keypad, touch screen and a keyboard.

16. The network data recording system of claim 14, wherein the second set of inputs includes a biometric input.

17. The network data recording system of claim 14, wherein at least one of the second set of inputs is operable to receive an authorization device.

18. A network data recording system for use in a transportation vehicle or aircraft, comprising:
   an imaging system operable to create digital imaging data;
   a sensory device remote from the imaging system and operable to sense a condition associated with the vehicle;
   a control panel operatively connected to the imaging system and the sensory device, the control panel being operable to display the digital imaging data and to provide an indication of the condition sensed by the sensory device; and
   a controller including:
      communication input operatively connected to receive input data transmitted from the imaging system, the sensory device, and the control panel, and
      a processor operable to process the input data to create processed data;
   wherein different levels of control panel rights are granted to different users.

19. The network data recording system of claim 18, wherein the different levels of rights confer different levels of operational control of the control panel to the different users.

20. The network data recording system of claim 18, wherein the control panel comprises a plurality of control panels disposed at selected locations in the vehicle, and a first one of the control panels is a master control panel and the other control panels are slave control panels.

21. The network data recording system of claim 20, wherein selected users are granted access to selected ones of the control panels.

* * * * *